UNITED STATES PATENT OFFICE.

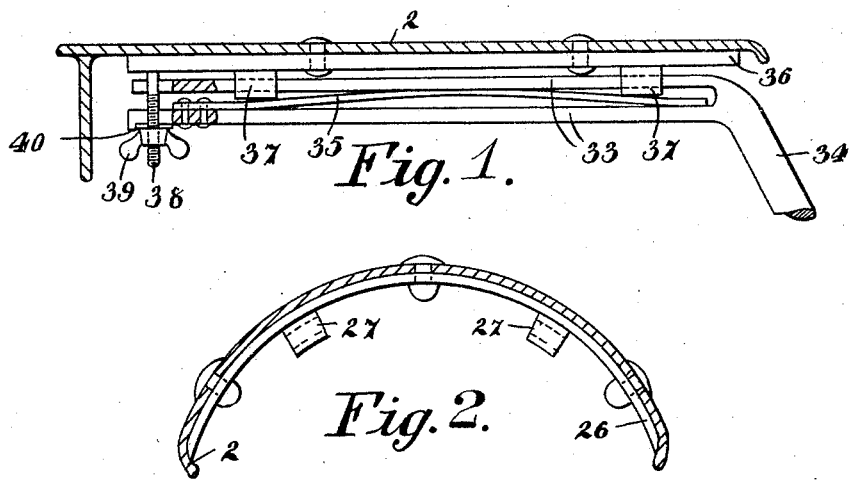

WILLIAM FAIRCLOUGH, OF WIGAN, ENGLAND.

MUD OR SPLASH GUARD FOR VEHICLES.

1,417,813.  Specification of Letters Patent.  Patented May 30, 1922.

Application filed February 17, 1920. Serial No. 359,268.

*To all whom it may concern:*

Be it known that I, WILLIAM FAIRCLOUGH, subject of the King of Great Britain, residing at Wigan, in the county of Lancaster and Kingdom of England, have invented certain new and useful Improvements in Mud or Splash Guards for Vehicles, of which the following is a specification.

This invention has reference to the mud or splash guards of automobiles or other vehicles for keeping wet and dirt (projected by the wheels when running) from reaching the occupants of such vehicles and for keeping the dress from rubbing against the wheels in entering or alighting.

In specification Serial No. 299783, May 26th, 1919, I have described mud or splash guards comprising in combination metallic brackets or slips permanently secured to the vehicle at spaced intervals apart, and mud guard units or segments adapted to be slid in between the said brackets to be otherwise engaged thereby at the ends so as to be removable.

The present invention has for its object to provide certain improvements in or modifications of the mud guards described in the parent specification.

These improvements will be understood from the following description reference being had to the accompanying drawings in which:—

Figure 1 is a view taken through the improved construction, the parts being shown partly in cross section and partly in side elevation, and Figure 2 is a similar view of a modified form of the construction.

As shown in Figure 1 the mud guard member or members 2 are mounted on top of the arms or strips 33 which are made integral at one end with the arms 34 fixed to the main frame of the chassis while at the other end these strips are self opening. 35 is a plate spring between arms 33 and riveted to one of them to prevent the parts from rattling and assist in making the strips self opening. To the underside of the mud guard is riveted at the ends reinforcing pieces 36, and from these reinforcing pieces lugs 37 project downwardly each having a hole in it so that these lugs will take onto and slide along the fixed arms or strips 33 that is to say the arms thread themselves through the lugs. The lugs 37 and the arms 33 are of course spaced the same distance apart. Near the outer edge of the mud guard bolts 38 project downwardly from the reinforcing pieces and enter open ended slots in the arms 33. The mud guard or mud guard segments are fixed in position by causing the holes in the lugs 37 to slide along the upper or fixed arms 33 and when the mud guard is pushed nearly home the bolts take onto the open ended slots at the outer end of the arms 33 whereupon the nuts 39 are screwed up thus compressing the two arms and locking the mud guard in position. The lower fixed arm 33 has a small drum turned shoulder 40 at the end which forms a stop for the nut 30 to abut against.

As shown in Figure 2 the mud guard segments 2 are reinforced at the underside by strips 26 riveted thereto, and from these strips lugs 27 project downwardly each having a hole passing therethrough and each pair of lugs is spaced at suitable distances apart. The brackets take the form of curved rods fixed by arms to the main frame of the chassis, and spaced the same distance apart as the pairs of lugs. The respective mud guard segments are fixed in position by causing the holes in the lugs to take onto and slide along the fixed arms that is to say, the arms thread themselves through the lugs.

I declare that what I claim is:—

1. A mud or splash guard comprising in combination mud guard units or segments reinforced on the underside by strips, lugs projecting downwardly from the underside thereof, arms or strips united at one end to an arm which is fixed to the chassis, a plate spring inserted between the strips to render the said arms or strips self opening, the parts being so arranged that the lugs will take onto and slide along the upper fixed arms, a bolt being provided to compress the said arms and lock the guard in position.

2. A mud or splash guard comprising in combination mud guard units or segments reinforced on the under side by transverse strips of the same cross sectional curvature as the mud guard segments, curved rods fixed by arms to the main frame of the vehicle and spaced the same distance apart as the strips, and a plurality of lugs projecting downwardly from the under side of each strip and having a perforation through them curved to the same radius as the said rods, whereby the lugs will take on to and slide along the rod.

In witness whereof, I have hereunto signed my name this 5th day of January, 1920, in the presence of two subscribing witnesses.

WILLIAM FAIRCLOUGH.

Witnesses:
JOHN McLACHLAN,
H. STIRK.